US005469133A

United States Patent [19]

Hensler et al.

[11] Patent Number: 5,469,133

[45] Date of Patent: Nov. 21, 1995

[54] TELEPHONE PAGER ALARM ENHANCEMENT AND METHOD THEREFOR

[76] Inventors: Scott E. Hensler, 3320 E. University Dr., Mesa, Ariz. 85213; Scott I. Bergman, 6436 E. Northridge St., Mesa, Ariz. 85205; Mike P. Costello, 19102 E. Via De Arboles, Queen Creek, Ariz. 852422

[21] Appl. No.: 158,397

[22] Filed: Nov. 29, 1993

[51] Int. Cl.$^{6}$ .................... G08B 5/22; H04B 3/36

[52] U.S. Cl. .................... 340/407.1; 340/311.1; 340/821.44; 340/825.46; 455/38.2

[58] Field of Search .................... 340/407.1, 426, 340/573, 311.14, 429, 825.44, 384.1, 825.46; 307/10.2; 180/287; 455/38.2

[56] References Cited

U.S. PATENT DOCUMENTS

| | | | |
|---|---|---|---|
| 3,864,668 | 2/1975 | Bickford | 340/675 |
| 3,940,739 | 2/1976 | Quinet | 340/533 |
| 4,333,093 | 6/1982 | Raber et al. | 340/636 |
| 4,369,398 | 1/1983 | Lowry | 340/683 |
| 4,794,394 | 12/1988 | Halstead | 340/902 |
| 4,933,664 | 6/1990 | Igawa et al. | 340/429 |
| 5,172,093 | 12/1992 | Nose et al. | 340/426 |
| 5,181,010 | 1/1993 | Chick | 340/429 |
| 5,216,407 | 6/1993 | Hwang | 340/426 |
| 5,289,159 | 2/1994 | Iwata | 340/426 |
| 5,319,355 | 6/1994 | Russek | 340/573 |
| 5,353,017 | 10/1994 | Suzuki et al. | 340/407.1 |

*Primary Examiner*—Brent Swarthout
*Assistant Examiner*—Hina Tong
*Attorney, Agent, or Firm*—Harry M. Weiss; Jeffery D. Moy

[57] ABSTRACT

Vibration of a pager is sensed by a piezoelectric crystal. A buffered output of the crystal is connected through a low pass filter to an input of a retriggerable monostable multivibrator having a period of approximately twenty milliseconds. In response to the twenty millisecond multivibrator being retriggered to provide a recognition pulse having a duration of approximately three seconds, a latch is set. An output of the latch drives an LED circuit that provides a visual indication of a page. In response to the latch being set, an astable multivibrator provides alarm pulses having a duration of approximately eight seconds with a thirty second interval therebetween. The output of the latch and the output of the astable multivibrator drive an audio alarm circuit through a selector switch. When the switch is thrown in one direction, the setting of the latch causes the alarm circuit to provide a continuous audible sound. When the switch is thrown in the other direction, the setting of the latch causes the alarm circuit to provide eight second bursts of sound at thirty second intervals.

13 Claims, 2 Drawing Sheets

TELEPHONE PAGER ALARM ENHANCEMENT AND METHOD THEREFOR

BACKGROUND OF THE INVENTION

1. Field of Invention

This invention relates generally to apparatus and methods for telephone communication and, more particularly, to apparatus and methods for providing an alarm in response to vibration of a telephone pager.

2. Description of the Prior Art

A telephone pager currently utilizes one of two modes of signalling a subscriber who has an incoming telephone call. In a first mode, an audible sound is emitted by the pager in response to a signal representation of the subscriber's telephone number being received. The sound is at a level selected to cause a minimum of interference with other activity in the vicinity of the pager. When the pager is carried by the subscriber in a theater, for example, the selected level would only disturb people in the vicinity of the pager.

In a second mode, the pager vibrates in response to the signal representation of the subscriber's telephone number being received. When the pager is carried in the theater, only the subscriber is aware of the vibration.

When the subscriber is asleep, for example, he may not be in close proximity to the pager. Therefore, neither the audible sound nor the vibration are likely to make the subscriber aware of the incoming telephone call. Hence, the subscriber does not respond to either the audible sound or the vibration. It should be understood that when the subscriber is either a doctor, a volunteer fireman or a person engaged in volunteer emergency work and does not respond, the result could be a loss of life. Heretofore, there has not been a suitably economical and reliable device for providing an enhanced alarm in response to the signal representation of the subscriber's telephone number being received.

SUMMARY OF THE INVENTION

An object of the present invention is a method and apparatus for issuing an alarm in response to vibration of a telephone pager.

BRIEF DESCRIPTION OF THE PREFERRED EMBODIMENT

According to the present invention, vibration of a telephone pager is sensed by a piezoelectric crystal which retriggers a retriggerable multivibrator at least once to provide a recognition pulse that has a desired duration. In response to the recognition pulse, a latch is set. The latch drives an alarm circuit.

The present invention is a circuit that issues a visual and audible alarm when a telephone pager vibrates in response to a signal representation of a subscriber's telephone number being received. The circuit does not issue a false alarm when the pager is inadvertently bumped, for example. The circuit is simple, economical and especially suited for the needs of doctors, firemen and people engaged in volunteer emergency work.

Other objects, features and advantages of the invention will be apparent from the following description of the preferred embodiment as illustrated in the accompanying drawing.

DESCRIPTION OF THE PREFERRED EMBODIMENT

Figure 1:
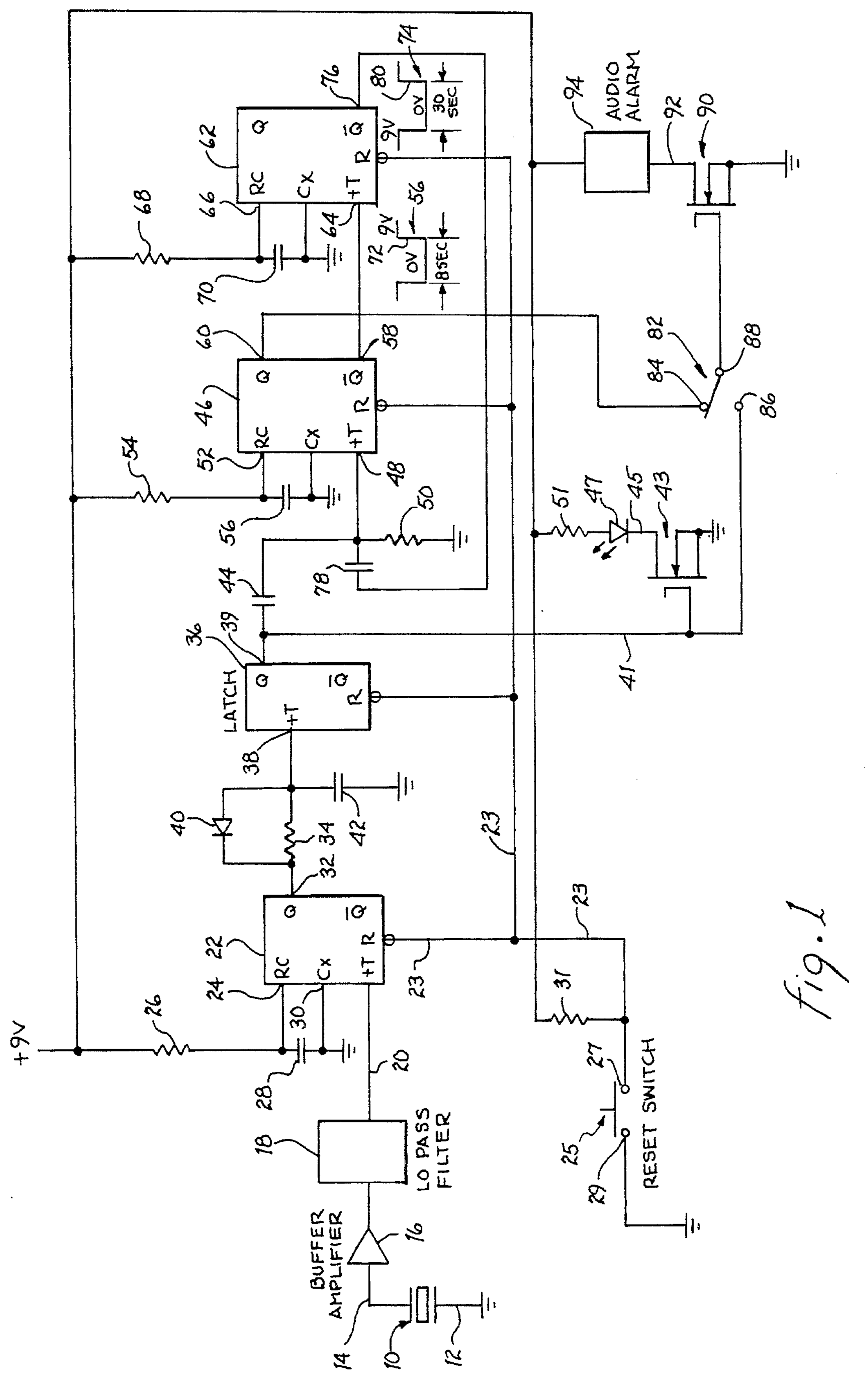
FIG. 1 is a schematic diagram of a preferred embodiment of the present invention.

As shown in FIG. 1, an enhanced alarm circuit includes a piezoelectric crystal 10 that has a first output signal line 12 connected to ground and a second output signal line 14 connected to the input of a buffer amplifier 16. As known to those skilled in the art, piezoelectric crystals have an output impedance on the order of one megohm.

Crystal 10 is connected to a telephone pager in a manner described hereinafter. Vibration of the pager causes crystal 10 to emit a trigger signal on line 14 with respect to line 12.

In this embodiment, buffer 16 has an input impedance greater than one megohm, an output impedance of several ohms and a gain of approximately unity. Therefore buffer 16 provides an impedance transformation whereby a buffered trigger signal at the output of buffer 16 is similar to the trigger signal provided by crystal 10 with the output impedance of buffer 16 substantially lower than the output impedance of crystal 10. Because of its lower output impedance, buffer 16 is suitable for driving inputs of other components.

The output of buffer 16 is connected to the input of a low pass filter 18 whereby the buffered trigger signal is provided to filter 18. Filter 18 provides a filtered trigger signal substantially comprised of components having frequencies lower than a cutoff frequency of 500 hertz. Components of the buffered trigger signal that have a frequency greater than the cutoff frequency are rejected.

The vibration of the pager is at a frequency lower than the cutoff frequency. Hence, the rejected components are undesired noise. In other words, filter 18 rejects components of undesired noise having frequencies greater than the cutoff frequency.

The output of filter 18 is connected through a signal line 20 to a retriggerable monostable multivibrator 22 at a positive trigger input thereof whereby the filtered trigger signal is provided to multivibrator 22. An RC input 24 of multivibrator 22 is connected to a nine volt source through a timing resistor 26. Input 24 is additionally connected to ground through a timing capacitor 28. A CX input of multivibrator 22 is connected to ground.

Multivibrator 22 has a period that is directly related to the product of the values of resistor 26 and capacitor 28. The values of resistor 26 and capacitor 28 are selected to cause multivibrator 22 to have a period of 20 milliseconds. Accordingly, in response to a positive filtered trigger signal, a positive recognition pulse having an amplitude of approximately nine volts and a duration of 20 milliseconds is provided at a true output 32 of multivibrator 22.

Since multivibrator 22 is retriggerable, when two successive positive filtered trigger signals with a time interval therebetween of less than twenty milliseconds are provided, the recognition pulse is initiated by the first positive filtered trigger signal but has a duration that extends to approximately twenty milliseconds after the time that the second positive filtered trigger signal is provided. The second positive filtered trigger signal is said to retrigger multivibrator 22. In a similar manner there may be a multiplicity of extensions of the recognition pulse caused by retriggering. Retriggerable multivibrators are well known to those skilled in the art.

It should be understood that an inadvertent bumping of the pager causes very few, if any, positive filtered trigger signals having the time interval therebetween of less than twenty milliseconds. Therefore, the bumping does not result in retriggering multivibrator 22 sufficiently to cause more than a few extensions of the recognition pulse.

Multivibrator 22 has a reset input, R, connected through a signal line 23 to a reset switch 25 at a contact 27 thereof. Additionally, line 23 is connected to the nine volt source through a resistor 31.

During an initialization of the enhanced alarm circuit, switch 25 is operated to cause a direct connection between line 23 and ground, thereby resetting multivibrator 22. The resetting causes a termination of a recognition pulse that may be provided at the time of the initialization whereby substantially zero volts is provided at output 32. Except for the initialization, switch 25 remains in an open condition whereby nine volts is provided on line 23. As explained hereinafter, other components of the enhanced alarm circuit are connected to line 23 for initialization purposes.

Output 32 is connected through a resistor 34 to a latch 36 at a positive trigger input 38 thereof. Resistor 34 is connected in parallel with a diode 40. More particularly, diode 40 has its anode and cathode connected to input 38 and output 32, respectively. Input 38 is additionally connected through a capacitor 42 to ground.

As known to those skilled in the art, the recognition pulse causes a charging current to flow through resistor 34 to store a charge on capacitor 42 and thereby provide a positive charge voltage at input 38. It should be understood that none of the charging current flows through diode 40 because its cathode is at a greater positive voltage (the recognition pulse) than its anode. In other words, when capacitor 42 is charging through resistor 34, the polarity of the voltage across diode 40 prevents a flow of current therethrough.

The rate of the charging of capacitor 42 is in accordance with a time constant which equals the product of the values of resistor 34 and capacitor 42. More particularly, the charge voltage is about 63% of the amplitude of the recognition pulse one time constant after the initiation of the recognition pulse when the duration of the recognition pulse is at least one time constant. In this embodiment, the time constant is three seconds.

When the recognition pulse terminates, output 32 is at ground, thereby changing the polarity of the voltage across diode 40 to cause capacitor 42 to discharge through diode 40. Since a diode has a low impedance when it conducts current, the charge voltage is reduced to substantially zero volts within a few milliseconds.

Latch 36 has a reset input, R, connected to line 23. The initialization causes latch 36 to be reset, whereby an output 39 of latch 36 provides substantially zero volts. However, after the reset operation, latch 36 is said to be set in response to the charge voltage equalling a trigger level of latch 36. When latch 36 is set, output 39 makes a transition from substantially zero volts to approximately nine volts. Thereafter, latch 36 is only reset by the initialization.

In this embodiment, the trigger level of latch 36 substantially equals 63% of the amplitude of the recognition pulse. Since the period of multivibrator 22 is 20 milliseconds and resistor 34 and capacitor 42 provide the three second time constant, retriggering multivibrator 22 sufficiently to provide at least 150 extensions of the recognition pulse causes latch 36 to set. Because the inadvertent bumping of the pager causes few, if any, positive filtered trigger signals having the time interval therebetween of less than twenty milliseconds, the inadvertent bumping does not cause latch 36 to set.

Output 39 is connected through a signal line 41 to an N channel FET 43 at the gate thereof. The drain of FET 43 is connected through a signal line 45 to an LED 47 at its cathode. The source of FET 43 is connected to ground. The anode of LED 47 is connected to the nine volt source through a resistor 51.

When latch 36 is set, FET 43 provides a low resistance connection between its drain and source, thereby causing a visual alarm current to flow through resistor 51 and LED 47. In response to the visual alarm current, LED 47 is illuminated whereby a visual alarm is issued by LED 47.

Output 39 is additionally connected through a capacitor 44 to a monostable multivibrator 46 at a positive trigger input 48 thereof. Multivibrator 46 is similar to multivibrator 22 described hereinbefore.

Input 48 is additionally connected through a resistor 50 to ground. An RC input 52 of multivibrator 46 is connected to the nine volt source through a timing resistor 54. Input 52 is additionally connected to ground through a timing capacitor 56. A CX input of multivibrator 46 is connected to ground.

In a manner similar to multivibrator 22, multivibrator 46 has a period that is directly related to the product of the values of resistor 54 and capacitor 56. The values of resistor 54 and capacitor 56 are selected to cause multivibrator 46 to have a period of eight seconds.

In response to latch 36 being set, a positive trigger pulse is generated at input 48 because of capacitor 44. In response to the positive trigger pulse, a negative eight second alarm pulse, graphically represented by a waveform 56, is provided at a complement output 58 of multivibrator 46. Correspondingly, a positive alarm pulse having an amplitude of approximately 9 volts and a duration of eight seconds is provided at a true output 60 of multivibrator 46.

Output 58 is connected to a monostable multivibrator 62 at a positive trigger input 64 thereof whereby the negative alarm pulse is provided to input 64. Multivibrator 62 is similar to multivibrator 22 described hereinbefore.

An RC input 66 of multivibrator 62 is connected to the nine volt source through a timing resistor 68. Input 66 is additionally connected to ground through a timing capacitor 70. A CX input of multivibrator 62 is connected ground.

In a manner similar to multivibrator 22, multivibrator 62 has a period that is directly related to the product of the values of resistor 68 and capacitor 70. The values of resistor 68 and capacitor 70 are selected to cause multivibrator 62 to have a period of thirty seconds. Accordingly, in response to the trailing edge of the negative alarm pulse, a thirty second negative interval pulse is provided at a complement output 76 of multivibrator 62. The trailing edge of the negative alarm pulse is graphically represented by an edge 72 of waveform 56. The negative interval pulse is graphically represented by a waveform 74.

Output 76 is connected through a capacitor 78 to input 48. Accordingly, in response to the trailing edge of the negative interval pulse, a positive end interval pulse is generated at input 48 because of capacitor 78, thereby causing multivibrator 46 to provide the negative and positive alarm pulses as described hereinbefore. The trailing edge of the negative interval pulse is graphically represented by an edge 80 of waveform 74.

It should be understood that multivibrators 46, 62 form an astable multivibrator whereby the alarm pulses are continually provided with a thirty second interval therebetween. Astable multivibrators are well known to those skilled in the art.

Multivibrator 46 has a reset input R connected to line 23. Similarly, multivibrator 62 has a reset input, R, connected to line 23. The initialization causes multivibrators 46, 62 to be reset, whereby output 60 provides substantially zero volts and outputs 58, 76 provide substantially nine volts. It should be understood that the alarm pulses cease when multivibrators 46, 62 are reset by the initialization.

Output 60 is connected to a single pole double throw selector switch 82 at a contact 84 thereof. Additionally, line 41 is connected to a contact 86 of switch 82.

The pole 88 of switch 82 is connected to an N channel FET 90 at the gate thereof. FET 90 is similar to FET 43 referred to hereinbefore.

The drain of FET 90 is connected through a signal line 92 to one input of an audio alarm 94. The other input of audio alarm 94 is connected to the nine volt source. The source of FET 90 is connected to ground.

When switch 82 is thrown to cause a direct connection between pole 88 and contact 86, a continuous audio alarm is issued by alarm 94 in response to latch 36 being set. When switch 82 is thrown to cause a direct connection between pole 88 and contact 84, the alarm pulses cause alarm 94 to issue audible bursts of sound having the eight second duration with the thirty second interval therebetween.

Figure 2:
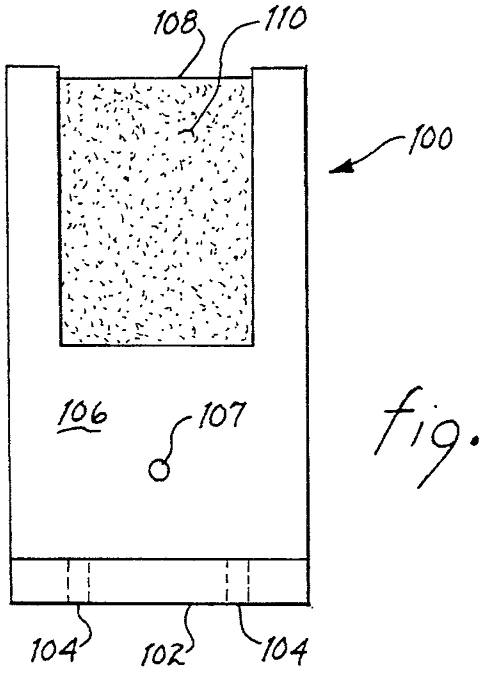
FIG. 2 is a front elevation of a mounting bracket for a telephone pager.
Figure 3:
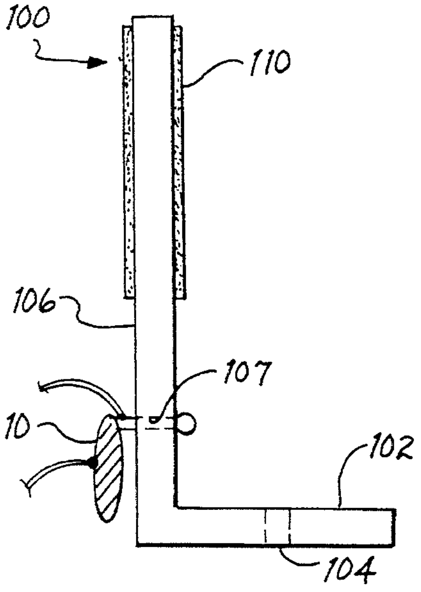
FIG. 3 is a side elevation of the mounting bracket of FIG. 2 whereon a piezoelectric crystal is mounted with its major axis extending vertically.
Figure 4:
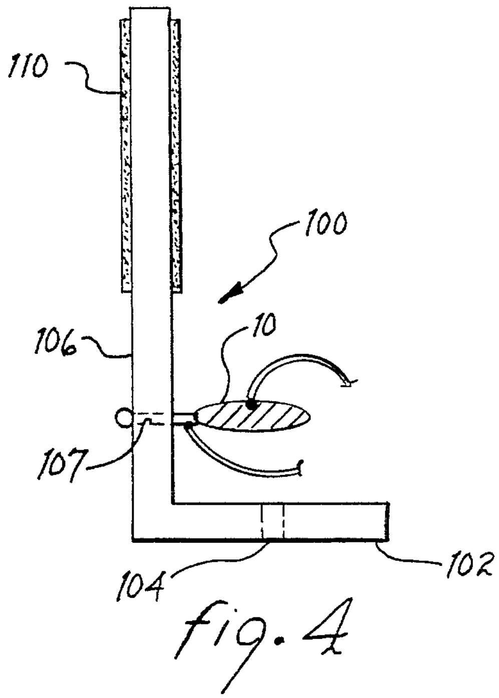
FIG. 4 is a side elevation of the mounting bracket of FIG. 2 whereon a piezoelectric crystal is mounted with its major axis extending horizontally.

As shown in FIGS. 2–4, a right angle mounting bracket 100 for the telephone pager is comprised of a baseplate 102 with a pair of mounting holes 104 therethrough. Holes 104 are used for placement of screws that connect bracket 100 to an enclosure (not shown) of components of the enhanced alarm circuit.

An upright section 106 of bracket 100 includes a hole 107 where crystal 10 is mounted. Wire leads of crystal 10 extend to the interior of the enclosure. Crystal 10 is alternatively mounted with its major axis perpendicular to baseplate 102 (FIG. 3) or parallel to baseplate 102 (FIG. 4).

Bracket 100 has a slot 108 in the top thereof. Preferably the slot and a central portion of section 106 carry a covering 110 made from either leather or naugahyde. Dimensions of section 106 and slot 108 are selected for easy mounting of the telephone pager thereon via a clip or any other easily removable fastening device.

It should be understood that the telephone pager vibrates horizontally. The horizontal vibration of the pager causes section 106 to similarly vibrate. The vibration of section 106 correspondingly vibrates crystal 10.

While the invention has been particularly shown and described with reference to a preferred embodiment thereof, it will be understood by those skilled in the art that changes in form and detail may be made therein without departing from the spirit and scope of the invention.

We claim:

1. An enhanced alarm circuit for signaling an individual when said individual is being paged, comprising, in combination:

a telephone,pager of the type that vibrates in response to receiving a signal representing said individual's telephone pager number;

means for sensing the vibration of the telephone pager and for providing a plurality of trigger signals in response thereto;

means for providing a recognition pulse of a desired duration in response to at least two successive said trigger signals having a time interval therebetween less than a known time; and means for issuing an alarm in response to said recognition pulse.

2. The enhanced alarm circuit of claim 1 wherein said sensing means is a piezoelectric crystal connected to a mounting bracket adapted for connection to said pager, said crystal providing said trigger signals in response to said vibration.

3. The enhanced alarm circuit of claim 2 wherein said sensing means additionally comprises:

a buffer amplifier of the type that has an output impedance on the order of a few ohms, an input thereof being connected to said crystal, said buffer amplifier providing buffered trigger signals in response to said trigger signals; and a low pass filter having an input connected to the output of said buffer amplifier, said filter providing filtered trigger signals where undesired noise having a frequency greater than a cutoff frequency is rejected.

4. The enhanced alarm circuit of claim 1 wherein said means for providing includes a retriggerable monostable multivibrator having a period substantially equal to said known time, said retriggerable multivibrator being retriggered at least once in response to said trigger signals.

5. The enhanced alarm circuit of claim 1 wherein said alarm issuing means comprises:

RC means, connected to said means for providing, for storing a charge voltage directly related to the duration of said recognition pulse;

a latch, having an input connected to said RC means, that is set in response to said charge voltage equalling a latch trigger level; and means for issuing a visual alarm in response to said latch being set.

6. The enhanced alarm circuit of claim 5 wherein said RC means comprises:

a resistor connected between said means for providing and said latch input;

a capacitor connected between said latch input and ground; and a diode with its cathode and anode respectively connected to said means for providing and said latch input.

7. The enhanced alarm circuit of claim 5 wherein said visual alarm means comprises:

an LED; and means for conducting a visual alarm current through said LED in response to said latch being set.

8. The enhanced alarm circuit of claim 5 comprising an astable multivibrator coupled to the output of said latch, said astable multivibrator continuously providing pulses of a known duration with a known interval therebetween in response to said latch being set.

9. The enhanced alarm circuit of claim 8 additionally comprising:

a selector switch having a pair of contacts respectively connected to the output of said latch and said astable multivibrator; and an audio alarm circuit connected to said switch, said audio alarm circuit issuing a continuous audible sound in response to said latch being set when said switch is operated to provide a direct connection of said audio alarm circuit to said latch, said audio alarm circuit issuing audible bursts of sound in response to said astable multivibrator pulses when said switch is operated to provide a direct connection of said audio alarm circuit to said astable multivibrator.

10. In the method of issuing an alarm signaling an individual when said individual is being paged, the steps of:

providing a telephone pager of the type that vibrates in response to receiving a signal representation of said individual's telephone pager number;

sensing the vibration of the telephone pager and providing a plurality of trigger signals in response thereto;

providing a recognition pulse in response to at least two successive trigger signals having a time interval therebetween less than a known time; and issuing an alarm in response to said recognition pulse.

11. In the method of claim 10 wherein said recognition pulse has a desired duration.

12. In the method of claim 10 wherein the step of issuing said alarm includes conducting a visual alarm current through an LED in response to said recognition pulse.

13. In the method of claim 10 wherein the step of issuing said alarm includes issuing bursts of sound of a known duration with a known interval therebetween in response to said recognition pulse.

* * * * *